(12) United States Patent
Ferlitsch et al.

(10) Patent No.: US 7,046,384 B2
(45) Date of Patent: May 16, 2006

(54) METHODS AND SYSTEMS FOR PRINT-PROCESSOR-BASED PRINT TASK ERROR RECOVERY

(75) Inventors: Andrew Rodney Ferlitsch, Tigard, OR (US); Jerry Steven Orleck, Portland, OR (US); Mary Louise Bourret, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 941 days.

(21) Appl. No.: 09/681,416

(22) Filed: Mar. 30, 2001

(65) Prior Publication Data

US 2002/0089688 A1 Jul. 11, 2002

Related U.S. Application Data

(63) Continuation-in-part of application No. 09/681,208, filed on Feb. 22, 2001.

(60) Provisional application No. 60/261,132, filed on Jan. 11, 2001.

(51) Int. Cl.
  *G06F 15/00* (2006.01)
  *G06F 13/28* (2006.01)
(52) U.S. Cl. .................. 358/1.15; 358/1.15; 358/1.14; 710/23
(58) Field of Classification Search ............... 358/1.15, 358/1.14, 1.18; 710/4, 16; 400/76, 120.01; 709/223, 220; 270/58.09
See application file for complete search history.

(56) References Cited

U.S. PATENT DOCUMENTS

| | | | |
|---|---|---|---|
| 5,241,397 A | 8/1993 | Yamada | 358/296 |
| 5,287,194 A | 2/1994 | Lobiondo | 358/296 |
| 5,528,734 A | 6/1996 | Sanchez | 395/115 |
| 5,699,495 A * | 12/1997 | Snipp | 358/1.15 |
| 5,845,058 A | 12/1998 | Shaw et al. | 395/114 |
| 5,859,711 A | 1/1999 | Barry et al. | 358/296 |
| 5,897,260 A | 4/1999 | Zingher | 400/719 |
| 5,978,650 A | 11/1999 | Fischer et al. | 455/3.1 |
| 5,982,996 A | 11/1999 | Snyders | 395/114 |
| 5,995,721 A | 11/1999 | Rourke et al. | 395/114 |
| 5,995,723 A | 11/1999 | Sperry et al. | 395/114 |
| 6,088,120 A | 7/2000 | Shibusawa et al. | 358/1.15 |
| 6,157,465 A | 12/2000 | Suda et al. | 358/407 |
| 6,229,622 B1 | 5/2001 | Takeda | 358/1.16 |
| 6,248,996 B1 | 6/2001 | Johnson et al. | 250/234 |
| RE37,258 E | 7/2001 | Patel et al. | 358/1.15 |
| 6,266,150 B1 | 7/2001 | Brossman et al. | 358/1.15 |
| 6,337,745 B1 | 1/2002 | Aiello, Jr. et al. | 358/1.15 |
| 6,348,971 B1 * | 2/2002 | Owa et al. | 358/1.15 |
| 6,552,813 B1 * | 4/2003 | Yacoub | 358/1.1 |

(Continued)

FOREIGN PATENT DOCUMENTS

JP 64-014043 1/1989

(Continued)

*Primary Examiner*—Kimberly Williams
*Assistant Examiner*—Saeid Ebrahimi-Dehkordy
(74) *Attorney, Agent, or Firm*—Krieger Intellectual Property, Inc.; Scott C. Krieger (57) ABSTRACT

Embodiments of the present invention comprise methods and systems which enable a user to detect the status of printing devices without the use of additional hardware or application program modification for this purpose. These embodiments comprise a print processor which can check printing device status prior to sending a print task to a printing device. These embodiments may further check the status of a printing device after a print task has been sent to the device and may determine whether a printing device has successfully completed a print task. Some embodiments may further redirect, restart and reconfigure print tasks with the help of printing device status information.

13 Claims, 8 Drawing Sheets

U.S. PATENT DOCUMENTS

| | | | |
|---|---|---|---|
| 2001/0038462 A1 | 11/2001 | Teeuwen et al. | 358/1.15 |
| 2002/0027673 A1 | 3/2002 | Roosen et al. | |
| 2002/0042798 A1 | 4/2002 | Takei et al. | |
| 2002/0101604 A1* | 8/2002 | Mima et al. | 358/1.15 |

FOREIGN PATENT DOCUMENTS

| | | |
|---|---|---|
| JP | 04-199218 | 7/1992 |
| JP | 05-270064 | 10/1993 |
| JP | 06-004239 | 1/1994 |
| JP | 08-101754 | 4/1996 |
| JP | 09-030040 | 2/1997 |
| JP | 09-319530 | 12/1997 |
| JP | 10-027149 | 1/1998 |
| JP | 10-031750 | 2/1998 |
| JP | 10-187393 | 7/1998 |
| JP | 10-207643 | 8/1998 |
| JP | 10-283130 | 10/1998 |
| JP | 10-340166 | 12/1998 |
| JP | 10-340167 | 12/1998 |
| JP | 11-015608 | 1/1999 |
| JP | 11-024860 | 1/1999 |
| JP | 11-143661 | 5/1999 |
| JP | 2000-099303 | 4/2000 |
| JP | 2000-132347 | 5/2000 |
| JP | 2000-151873 | 5/2000 |
| JP | 2001-088405 | 4/2001 |

* cited by examiner

METHODS AND SYSTEMS FOR PRINT-PROCESSOR-BASED PRINT TASK ERROR RECOVERY

CROSS REFERENCE TO RELATED APPLICATIONS

This application claims the benefit of Provisional Application Ser. No. 60/261,132, entitled "Methods and Systems for Print-Processor Modified Printing" filed Jan. 11, 2001 by inventors Ferlitsch et al. This application further claims the benefit of U.S. patent application Ser. No. 09/681,208, entitled "Methods and Systems for Print-Processor Modified Printing" filed Feb. 22, 2001 by inventors Ferlitsch et al as a continuation-in-part thereto. Another concurrently filed U.S. patent application entitled "Methods and Systems for Print-Processor-Based Printer Status Detection and Print Task Distribution" by inventors Ferlitsch et al, application Ser. No. 09/681,409, is incorporated herein by reference.

BACKGROUND OF INVENTION

Many offices can generate a high volume of printer output or require high print rates to meet deadlines. When these needs are fairly constant, large, high-production printers and associated hardware may be required. These high-production units are expensive to procure and maintain and, generally, are only made economically feasible by a constant high demand for printer output. When printer requirements fluctuate, the costs of these high-production printers are difficult to justify. However, when sporadic, high printer throughput is a necessity, some offices are forced to bear the costs of expensive printer equipment that runs at well below its capacity most of the time.

Cluster printing has been introduced to avoid this problem. Cluster printing involves the use of multiple printers in a network. With cluster printing, print tasks can be sent to a multiple printer network with a capacity that rivals the capacity of expensive, high-throughput equipment. Generally, this network is comprised of multiple lower-production printers that may already exist in an office environment making the cost of the network very manageable.

Through the use of cluster printing, a user may choose to split a single print task among several printers to increase print task speed and decrease print time. Print tasks that include multiple copies may be divided so that each printer in a network prints some of the copies. Other variations of print job and print task distribution may also be implemented.

Cluster printing may be implemented through specialized printers which contain cluster-enabling firmware. When these printers are interconnected via cables, they can share printing jobs. In some cases, the marking engines are connected to enable division of printing tasks between the connected printers.

Other methods of implementing cluster printing functions require the use of additional hardware or application software. Typically, a specialized print server is used. This server is generally a high-performance general purpose computer to which print jobs are directed by the network. Specialized software on the server allows print tasks or copies thereof to be distributed among multiple printers that are managed by the server.

These known cluster printing implementations require specialized printer or server hardware or software to provide cluster printing functions.

Another problem that exists in single printer, cluster printing, network printing and other environments is that of printer status detection. When a print task is initiated, a user typically selects a printer or printers based on the printers' location and/or capabilities. However, if one or more selected printers are offline, in an error state, busy, or for some other reason, unavailable, the print task may not be completed in an acceptable time period or may not be completed at all. Typically, an error message is returned to the user who must then select another printer or correct the problem preventing the selected printer from functioning. In some network printing cases involving print queues, no error message is returned and the user is left unaware of the printing problem. When a print task is time sensitive this process can be frustrating causing missed deadlines and tarnished reputations.

Printer status detection can be especially important in cluster printing environments where print tasks are divided among several printing devices. When a user or the user's computing device is not aware of the status of the printing devices selected for printing, a print task or portions thereof can be delayed, interrupted or lost.

SUMMARY OF INVENTION

Embodiments of the present invention comprise methods and systems which detect printer status and distribute print tasks to a plurality of printing devices without the use of additional hardware or server software for this purpose. These functions may be used to achieve print task error recovery when print task errors occur. Printer status may be detected prior to print task despooling and during despooling. When a print task has failed, these embodiments may "roll over" a failed task to another printing device. Tasks may be restarted, redistributed or otherwise recovered after a printing error. These systems and methods are typically used in conjunction with a computer network comprising at least one computing device and a plurality of printing devices. Printing tasks which are typically sent to a user-selected printing device may be restarted or redistributed to available printing devices when errors occur. This printer status detection, availability determination and redistribution capability can be achieved without the use of additional hardware and firmware and without modification to software applications.

Embodiments of the present invention comprise a novel print processor which is capable of detecting the status of printing devices. This detection may take place when a print task is sent to the print processor, prior to print task transmission, prior to despooling, during despooling, during another part of the printing process, at some other time or at multiple times. Typically, printing device status is initially detected at the time a print task is sent to the print processor. If a print task is initially directed to a printing device that is unavailable or otherwise unable to function for the current task, the print processor of the present invention may redirect the print task or unprinted portions thereof to another printing device that is available for use. If a print task is directed to a device that fails after commencement of a print task, the task may be redirected or restarted on another device that has not failed.

BRIEF DESCRIPTION OF DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The figures listed above are expressly incorporated as part of this detailed description. It will be readily understood that the components of the present invention, as generally described and illustrated in the figures herein, could be arranged and designed in a wide variety of different configurations. Thus, the following more detailed description of the embodiments of the systems and methods of the present invention, as represented in FIGS. 1 through 5 is not intended to limit the scope of the invention, as claimed, but it is merely representative of the presently preferred embodiments of the invention. The currently preferred embodiments of the present invention will be best understood by reference to the drawings, wherein like parts are designated by like numerals throughout.

The definitions in this and subsequent paragraphs apply throughout this specification and related claims. The term "print job" may refer to any combination of data that can be printed. A print job may comprise text and/or graphics and may comprise part of a page, a single page or many pages. Print jobs may be rendered, unrendered, journaled or otherwise. Generally, a print job is generated by an application, such as a word processor, spread sheet, etc., however, a print job may also comprise a file or data in memory that may be sent directly to a print process.

The term "print copy" or "copy" may refer to data, code or commands which generate a single printing device output of a print job or may refer to the actual hard copy output of the print job.

The term "print task" may comprise any combination of print jobs and copies thereof. A print task may comprise one or more print jobs and one or more copies of each print job.

The term "copy splitting" may refer to a process by which a print task comprising multiple copies is divided into multiple modified print tasks with each modified print task comprising a portion of the total number of copies.

The term "job splitting" may refer to a process by which a print task comprising at least one print job is split into multiple modified print tasks with each modified print task comprising a portion of a print job.

References to a Microsoft Windows® or Windows® operating system may refer to any version or variation of a Microsoft Windows® operating system comprising Windows 95®, Windows 98®, Windows NT®, Windows 2000®, Windows ME®, Windows XP® and others. While exemplary embodiments of the present invention may be directed to a Windows® operating system and environment, systems and methods directed to other operating systems such as Macintosh®, UNIX, DOS, Linux, MVS and others are to be contemplated within the scope of the present invention.

Embodiments of the present invention typically comprise one or more computing devices in communication with a plurality of printing devices. Embodiments which utilize a Microsoft Windows® operating system generally comprise a printer driver, spooler and print processor which process print tasks generated through the operating system and applications running on the operating system. Embodiments used in conjunction with other operating systems will utilize similar processing elements. Exemplary embodiments of the present invention will be described with terminology related to a Microsoft Windows® environment, however these terms shall relate to equivalent elements in other operating systems. For example, the print processor described in many embodiments will relate to a print processor common in the Windows® environment as well as elements with equivalent functions in other operating systems.

In a Windows® environment, a print task is generally initiated through selection of a print option in an application, but may be otherwise initiated by automated, background and scheduled processes or by other means. This selection will typically invoke a print dialog which comprises means for selecting one or more printing devices. In cluster printing embodiments, cluster printing options may also be selected. Once the device or devices are selected, the print task is sent to a driver which configures the print task and creates a spool file which is sent to a spooler. A driver may also create EMF files which can be stored separately from the spool file and accessed by drivers such as cluster printer drivers. Once the spool file is created, a spooler may spool the spool file to a print processor which interprets and processes spool file data and forwards the print task to a printing device either directly or through a spooler and may possibly initiate rendering or PDL creation via a printer driver.

Typically, when a print task is initiated, either through an application, through an operating system command or by some other means, a user will specify one or more printing devices to which the print task or tasks will be sent. This may be performed through a driver dialog process or by other means. The print task or tasks will then proceed through the driver and spooler to a print processor. Prior to spooling data to a printing device, the print processor will check the status of printing devices in communication with the print processor and its host computing device. If any of the devices selected by a user are not available and/or simply busy, the tasks which were initially designated for that device are "rolled over," redirected or redistributed to one or more other devices that are available.

Once a print task has begun despooling to the printing devices errors may occur. During print task despooling, embodiments of the present invention may detect printing device status or despooling status of the print tasks. If errors are detected, a print task may be redirected or redistributed to another device or devices which are available or otherwise usable for the print task. As a non-limiting example, embodiments may detect whether a successful write/playback to a local printer port, remote printer or a network print queue has occurred.

The systems of some embodiments of the present invention comprise a plurality of homogeneous printers. Homogenous printers are printers with similar Printer Definition Language (PDL) interpreter support, similar device drivers and similar marking engines. These printers are generally connected together in a common network environment. These systems also comprise a computing device capable of spooling a print job (spooler), a printer driver and a print processor compatible with the printing devices. These embodiments may also comprise a Microsoft Windows® 9x, NT, 2k, XP or similar operating system.

Using these systems, a user generally initiates a print task, comprising one or more print jobs. A print job may be a document or portion of a document with each document comprising one or more pages. A print task may also comprise one or more copies of a print job. A print task may be pre-processed into printer ready data, such as an application rendering its output into a Printer Definition Language (PDL), such as PCL, Postscript, PDF, TIFF or others. A print task may also be journaled, where the rendering instructions are recorded, and the playback of the rendering instructions is deferred, such as Enhanced Meta File (EMF, Microsoft Corp) and Printer Meta File (PMF, Sharp Corp) or others.

Upon initiation of the print task, the user selects a command, sequence of commands, or some other stimulus to communicate to a computing device that the user intends to spool a print job. A computing device responds to the user by presenting the user a dialog, such as a Printer UI, command line query, front panel display or other prompt, in which the user can select options relating to the spooling of the print job. One of the options may be the selection of the printing device to which a print task may be transmitted. A printing device may comprise a printer, plotter, Multi-Function Peripheral (MFP), CD burner or other device which generates a copy. Once the printing device(s) are selected, the computing device responds by loading the device driver and print processor associated with the printing device(s). The device driver responds, automatically or by user initiation, to the user by presenting the user a dialog, in which the user can select options relating to the printing device's capabilities. These device capabilities may comprise print quality, paper size, orientation, tray selection, manual feed, stapling, watermarks and other options.

In these systems, a dialog presented to the user for selecting options specific to the printing device's capabilities may comprise a dialog related to cluster printing. Within a cluster printing dialog, a user may choose to use multiple printing devices and may choose to perform copy splitting, job splitting or other cluster printing options. A cluster printing dialog may comprise a display of all the selectable printing devices in the cluster from which a user may select one, none, multiple, or all of the devices to which a print task may be despooled. Cluster printing options may also be pre-selected by prior printer settings by a user or administrator. Cluster printing options may also be communicated through a dialog presented by a print processor or spooler and may be read from memory, disk, database, registry or elsewhere.

Once the user has completed selecting options specific to both a print task and a printing device(s), the computing device may initiate the spooling of the print task. This process may comprise: 1) the printer driver constructing print task specific information (e.g. DEVMODE in Microsoft Operating Systems); 2) compilation of rendering instructions; and 3) the rendering of (i.e., preprocessed into printer ready data) or recorded for deferred playback (i.e., journaling). A print task may, partly or in whole, be already rendered into printer ready data and the step of compiling rendering instructions may then be skipped partly or entirely. The output from the print driver (i.e., spooled print task) may additionally contain information regarding cluster options selected for the print task, including job splitting, copy splitting, a list of selected printers to which a print task may be despooled and other options. The output is generally referred to as a spool file, with the contents generally referred to as spool data. A spool file may be recorded on disk, in memory, in cache or other forms of storage compatible with the computing device.

Once a spool file is completed, the computing device passes, immediately or delayed, the spool file to the associated print processor for the selected printing device(s). This process is accomplished through a "spooler." A print processor reads the spool file and determines if the content is preprocessed printer ready data (e.g., RAW mode in Microsoft operating systems), or journaled (e.g., EMF mode in the Microsoft operating systems). A print processor may also determine cluster printing options, including job splitting, copy splitting, the selected printing devices and other options. The first selected printing device, may be referred to as the "default" printing device. Despooling of a print task to printing devices may take several routes depending on whether the spool data is preprocessed printer ready data or journaled data, and whether job splitting or copy splitting has been selected.

Prior to and during the despooling of a print task, several things can go wrong. These include, but are not limited to: 1) printer unavailability (offline); 2) busy printer; 3) printer port problems; and 4) printer queue problems. The following sections describe systems for recovering from these errors, by job rollover, job redistribution, job restarting and other methods.

Figure 1:
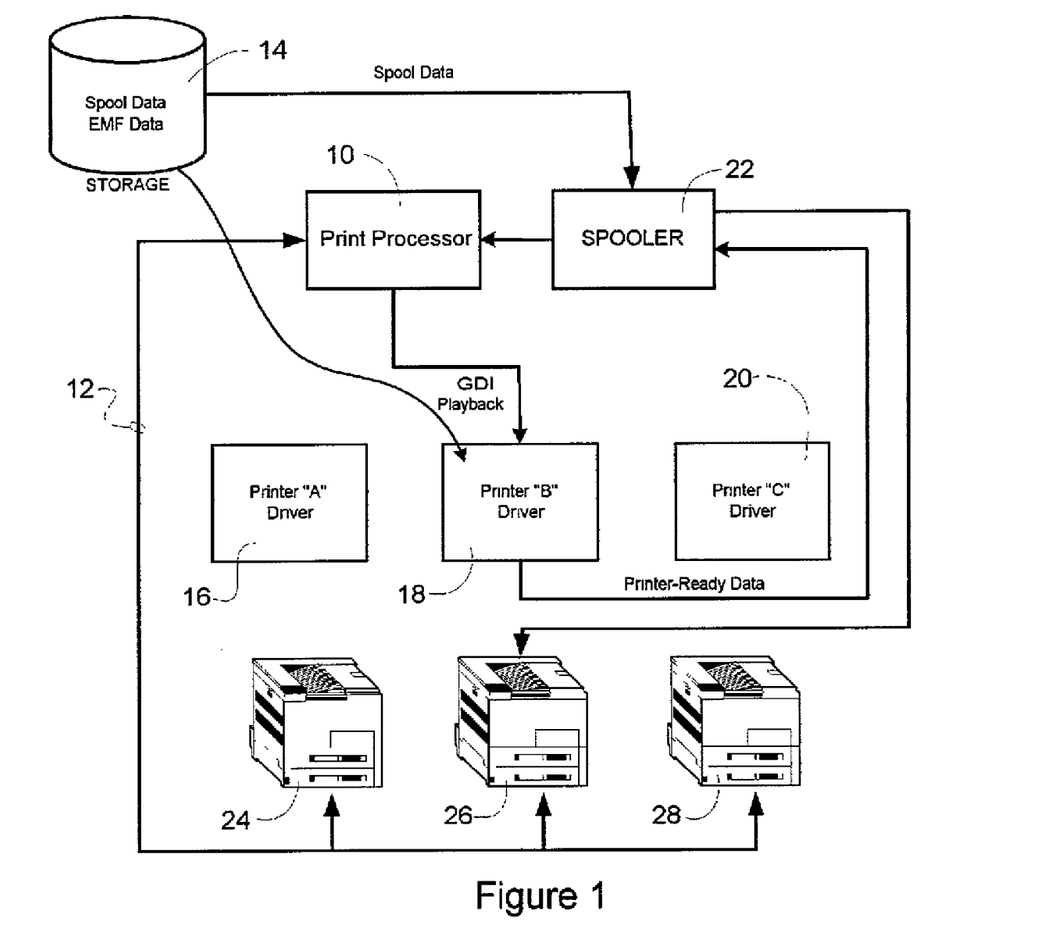
FIG. 1 is a diagram showing an embodiment of the present invention comprising printer status detection and print task roll over for a single print task in EMF mode.

When an error occurs in EMF mode printing prior to despooling of the print task, embodiments of the present invention may roll the task over to another available device, as described in reference to FIG. 1. Upon initiation of a print task, but prior to despooling, the print processor 10 checks 12 the status of printers 24, 26 and 28 in communication with the user's computing device. Printers may be ready, offline, busy or some other status. If the status is offline or busy, the printer may be determined to be unavailable. If the print task is configured for a single printer, by default, the print task would be sent to the default printer 24 associated with the default print driver 16. If this printer is unavailable, the print processor 10 will roll over the print task to the next available printer 26 through its driver 18. If no printer is available, the print processor 10 may roll over the print task to the next printer whose status is busy 28 through its driver 20. If all printers are offline, the print task may be canceled and the user notified. When a print task is rolled over to a printer other than its original destination, the print processor will play back 30 the journaled data to the print driver 18 associated with the printer 26 to which the print task was rolled over, and notify the user of the task destination and/or status.

Figure 2:
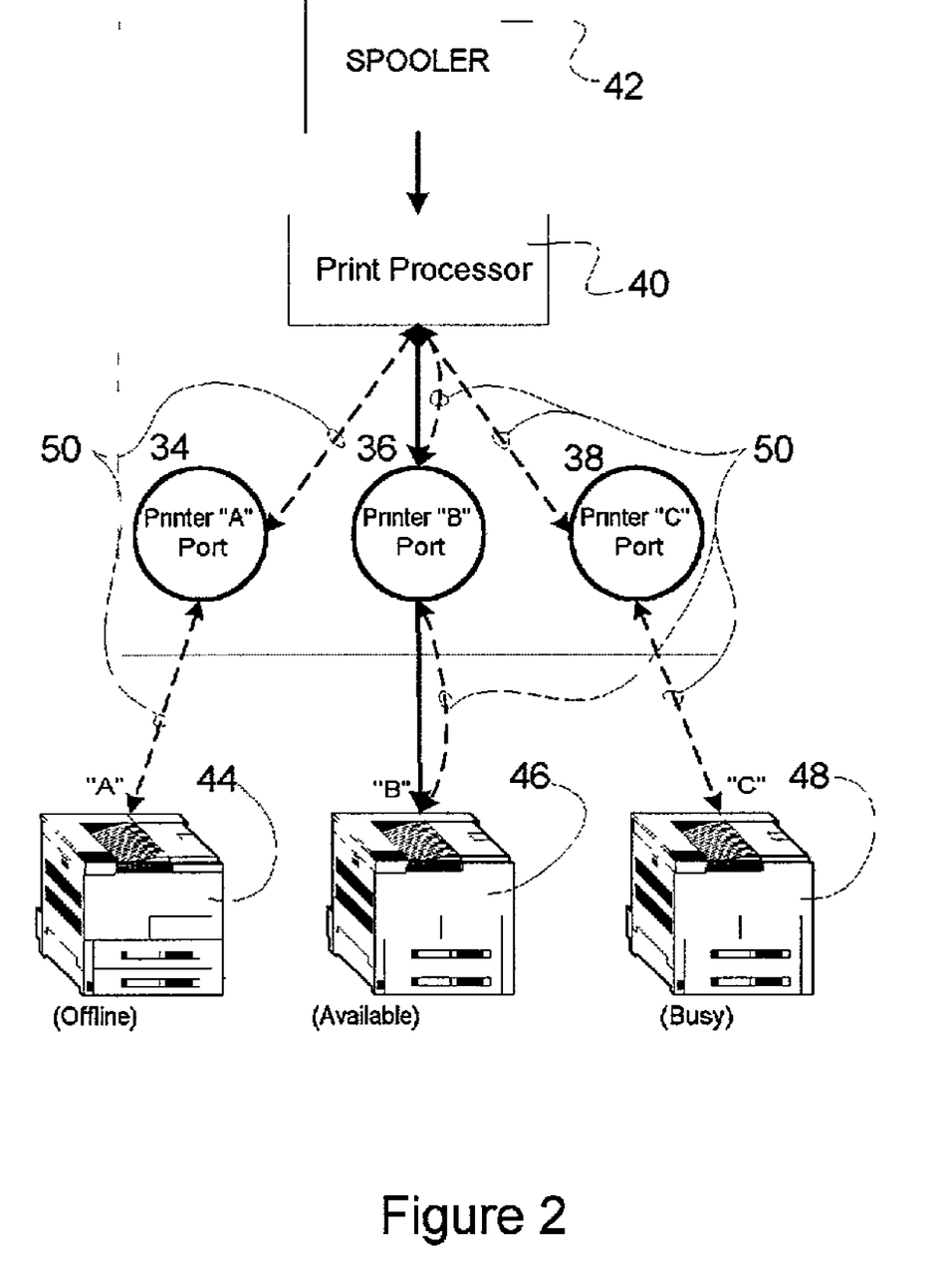
FIG. 2 is a diagram showing an embodiment of the present invention comprising printer status detection and print task roll over for a single print task in RAW mode.

When an error occurs in RAW mode printing prior to despooling of the print task, embodiments of the present invention may roll the task over to another available device, as described in reference to FIG. 2. Upon initiation of a print task, but prior to despooling, the print processor 40 may check 50 the status of printers in communication with the user's computing device. These printers may be classified as being available, offline, busy or some other status. If the status is offline or busy, the printer may be determined to be unavailable. If the task is designated for a single printer, by default, the print task would be sent to the port 34 associated with the default printer 44. If the default printer 44 is unavailable, a print processor 40 may roll over the print task to the port 36 associated with the next available printer. If no printer is available, the print processor 40 may roll over the print task to the port 38 associated with the next printer whose status is busy 48. If all printers are offline, the print task may be canceled and the user notified. If the print task is rolled over to another printer, the print processor will write 32 the printer ready data to the printer port associated with the printer to which the print task was rolled over, and notify the user.

Figure 3:
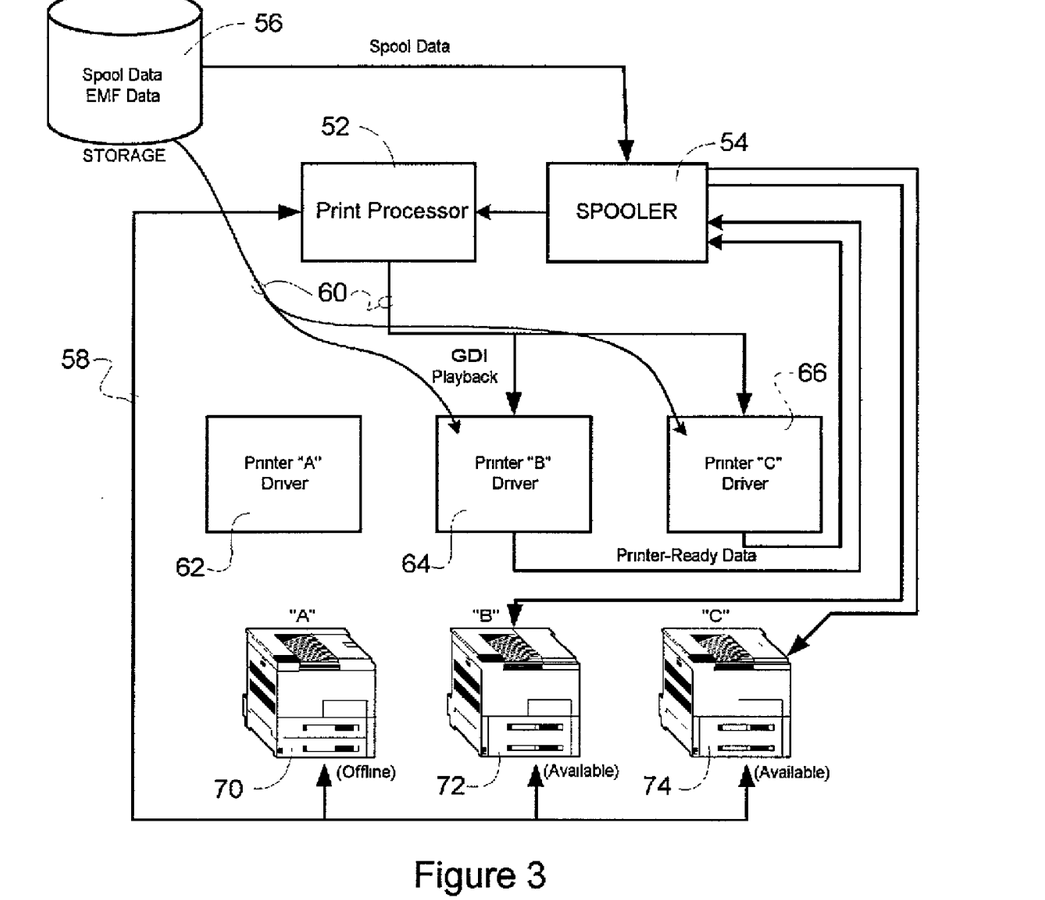
FIG. 3 is a diagram showing an embodiment of the present invention comprising printer status detection and print task redistribution for a cluster print task in EMF mode.

When an error occurs in EMF mode printing prior to despooling of the print task, embodiments of the present invention may redistribute the task to other available devices, as described in reference to FIG. 3. Upon initiation of a print task, but prior to despooling, the print processor 52 may check 58 the status of printers 70, 72 and 74 in communication with the user's computing device. These printers 70, 72 and 74 may be classified as being ready, offline, busy or some other status. If the status is offline or busy, the printer may be determined to be unavailable. If the task is configured for multiple printers, the print task may be redistributed across the available printers or a backup set of printers. If no printers are available, the print processor may redistribute the print task to printers whose status is busy. If all printers are offline, then the print task may be canceled and the user notified. When printers are available or simply busy, the print processor may play back the journaled data to the print drivers associated with the printers to which the print task was redistributed and notify the user.

As a non-limiting example of this type of task redistribution, a user may select printer "A" 70 and printer "B" 72 as default printers for a cluster printing task. When the cluster task arrives at the print processor 52, the print processor 52 checks 58 the status of the printing devices and determines that printer "A" 70 is offline. Therefore, the original cluster task cannot be completed using the default selection. However, the print processor 52 may determine that another printer is available to take the place of printer "A" 70, for example, printer "C" 74 may be available. In this case, print processor 52 may redistribute the print task to printer "B" 72 and printer "C" 74. When this is done, the print processor 52 may redistribute spool data and EMF files 56 to the drivers 64 and 66 associated with the available printing devices 64 and 66. This task playback 60 is sent to the available drivers 64 and 66 and forwarded to a spooler 54 for spooling 80 and 82 to the available printing devices 72 and 74.

Figure 4:
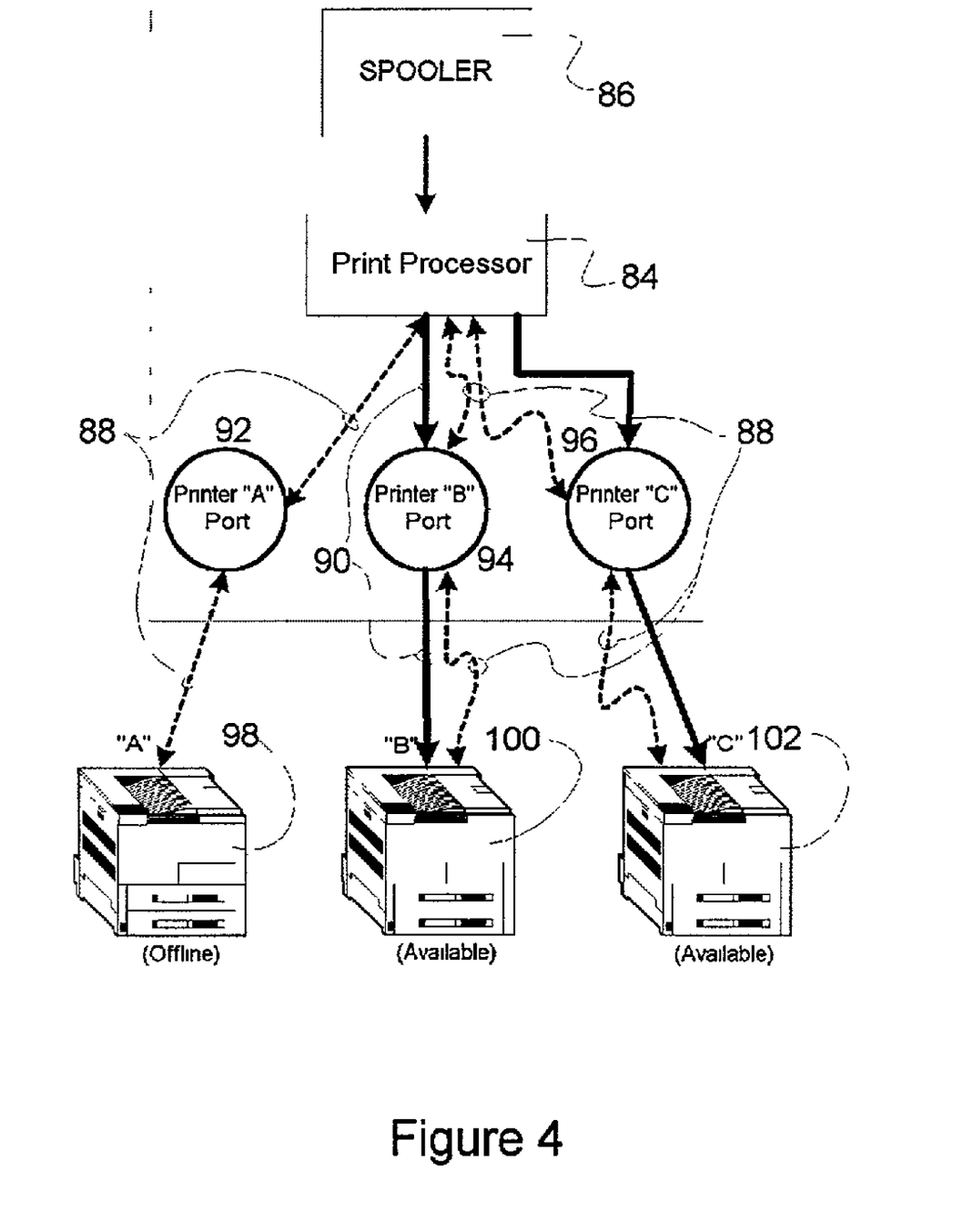
FIG. 4 is a diagram showing an embodiment of the present invention comprising printer status detection and print task redistribution for a cluster print task in RAW mode.

When an error occurs in RAW mode printing prior to despooling of the print task, embodiments of the present invention may redistribute the task to other available devices, as described in reference to FIG. 4. Upon initiation of a print task, but prior to despooling, the print processor 84 may check 88 the status of printers 98, 100 and 102 in communication with the user's computing device. These printers 98, 100 and 102 may be classified as being available, offline, busy or some other status. If the status is offline or busy, the printer may be determined to be unavailable. When a task is configured for multiple printers, the print task may be redistributed across the available printers. If no printers are available, the print processor may redistribute the print task to printers whose status is busy. If all printers are offline, then the print task may be canceled and the user notified. When printers are available or simply busy, the print processor will write the printer ready data to the printer ports associated with the printers to which the print task was redistributed and notify the user of task destinations and status.

As a non-limiting example of this type of task redistribution in RAW mode printing, a user may select printer "A" 98 and printer "B" 100 as default printers for a cluster printing task. When the cluster task arrives at the print processor 84, the print processor 84 checks 88 the status of the printing devices and determines that printer "A" 98 is offline. Therefore, the original cluster task cannot be completed using the default selection. However, the print processor 84 may determine that another printer is available to take the place of printer "A" 98, for example, printer "C" 102 may be available. In this case, print processor 84 may redistribute the print task to printer "B" 100 and printer "C" 102. When this is done, the print processor 84 may redistribute printer ready data 90 to the ports 94 and 96 associated with the available printing devices 100 and 102. This task redistribution 90 is sent to the available printers' ports 94 and 96 and forwarded to the available printing devices 100 and 102.

Figure 5:
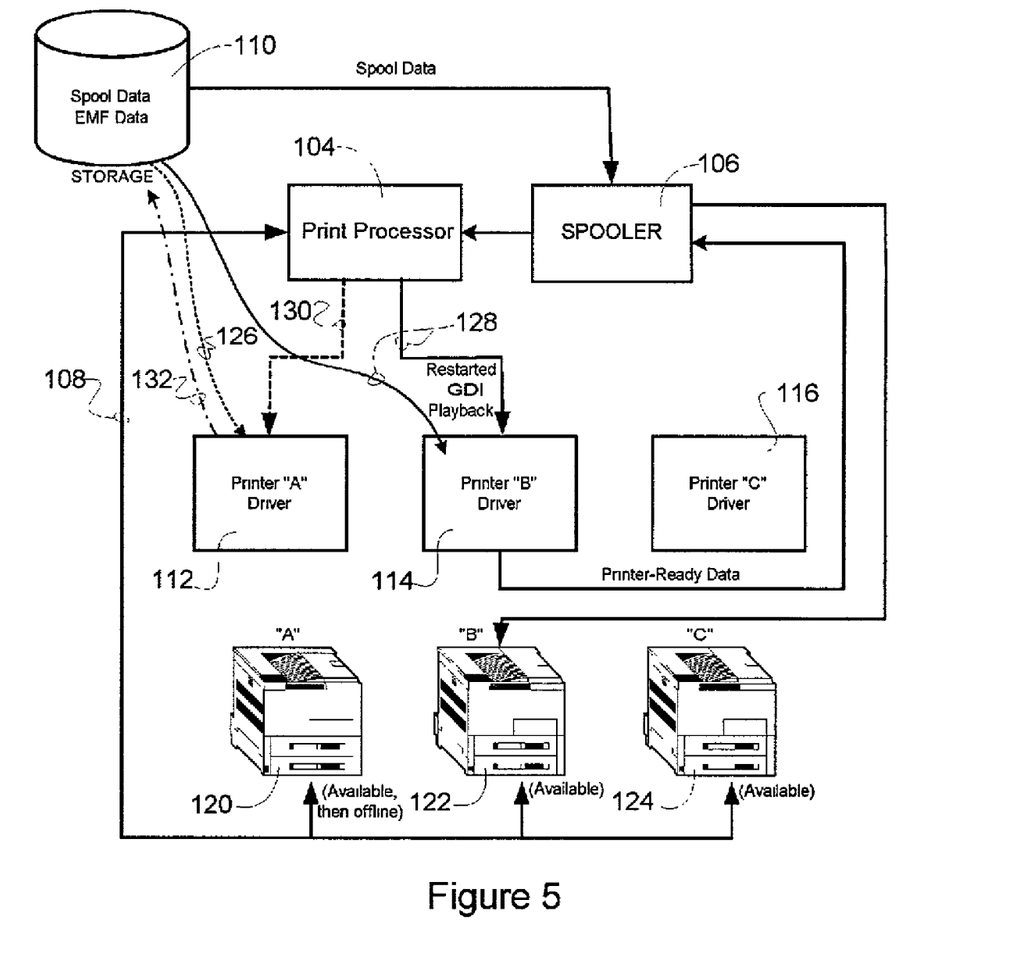
FIG. 5 is a diagram showing an embodiment of the present invention comprising print task error detection and print task redistribution for a single print task in EMF mode.

When an error occurs in EMF mode printing during despooling of the print task, embodiments of the present invention may rollover or redirect and restart the task on another available device, as described in reference to FIG. 5. If a print task is configured for a single printer, during despooling (i.e., playback to driver in EMF mode), the print processor 104 checks if the playback 130 of the journaled data to the printer driver 112 of the default printer 120 failed. If the playback fails, the print task for this printer is aborted. The print processor 104 then checks 108 the status of other printers in communication with the user's computing device. If the status is offline or busy, the printer is determined to be unavailable. The print processor 104 may roll over and restart the print task on the next available printer in the cluster. If no printer is available in the cluster, then the print processor will roll over and restart the print task to the next printer whose status is busy. If the playback on the rolled over printer fails, the print processor will repeat the above steps and roll over and restart the print task on another printer in the cluster. If all printers are offline, the print task may be canceled and the user notified. If the print task is rolled over to another printer in the cluster, the print processor may restart the playback of the journaled data to the print driver associated with the printer to which the print task was rolled over and notify the user.

As a non-limiting example of this type of task rollover during despooling, a user may select printer "A" 120 as a default printer for a printing task.-When the task arrives at the print processor 104, the print processor 104 may check the status of connected printing devices and determine printer availability as explained above. When an appropriate printing device has been selected, playback of spool data 130 and EMF data 126 may begin. In this example, the default device 120 is originally determined to be available and the print task is sent to the default destination, the driver 112 associated with the default printer 120. However, during despooling of the print task to the default printer driver 112, a problem occurs which causes a failure in the printing process. This failure is communicated to the print processor 104, thereby signaling the print processor 104 to abort task playback, check 108 the status of the printing devices and again determine their availability. When another printer 122 is available, the print processor 104 may restart playback 128 of the print task to the driver 114 associated with the available printer 122. The driver 114 then interprets the task data and forwards the task to the spooler 106 to be spooled to the new destination printer 122.

Figure 6:
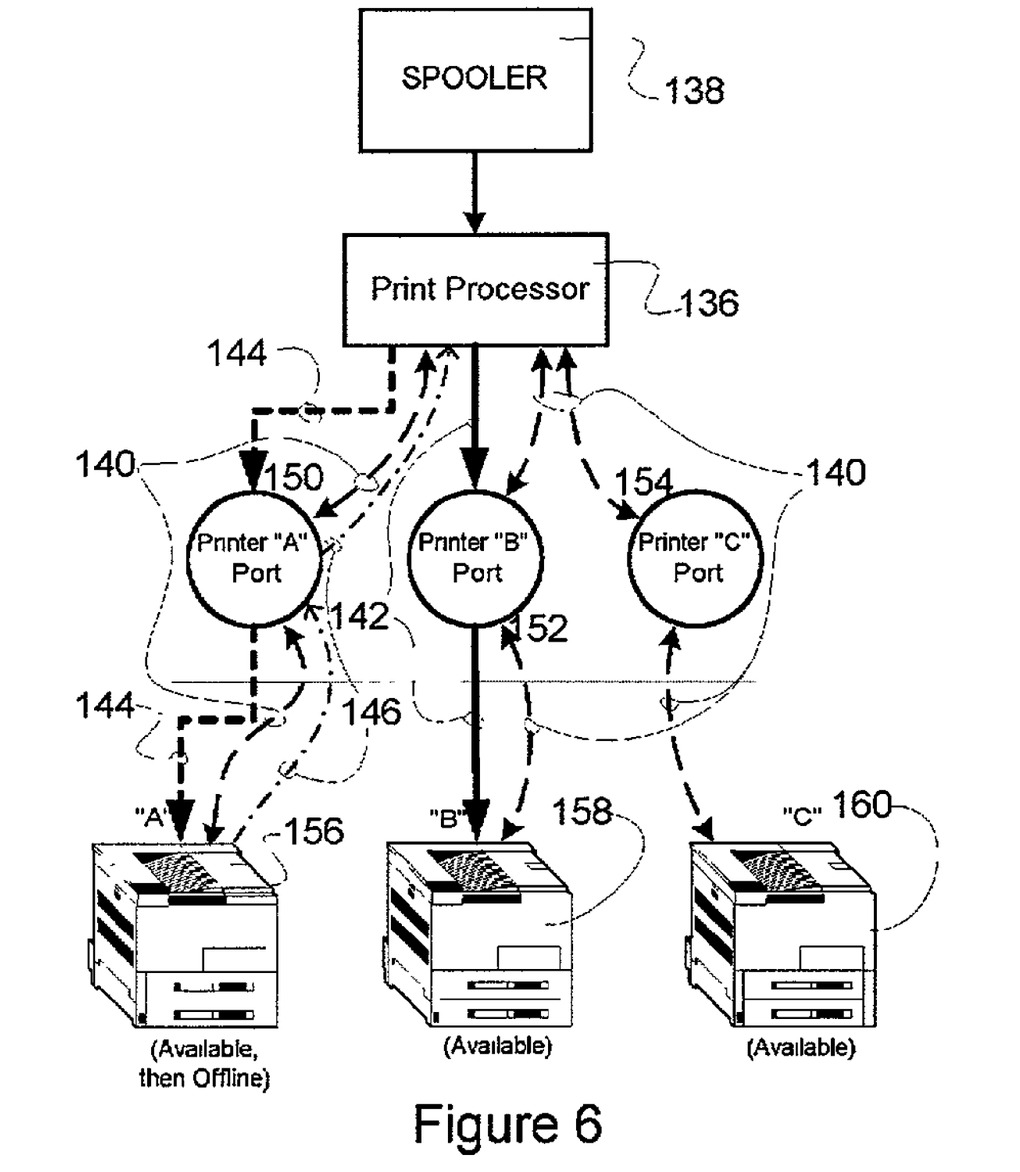
FIG. 6 is a diagram showing an embodiment of the present invention comprising print task error detection and print task redistribution for a single print task in RAW mode.

When an error occurs in RAW mode printing during despooling of the print task, embodiments of the present invention may rollover or redirect and restart the task on another available device, as described in reference to FIG. 6. If the print task is configured for a single printer, during despooling (i.e., write to printer port in RAW mode), the print processor 136 checks if the write 144 of the printer ready data to the printer port 150 of the default printer failed. If the write fails, the print task for this printer may be aborted. The print processor 136 then checks 140 the status of the remaining printers in the cluster. If the status is offline or busy, the printer may be determined to be unavailable. The print processor 136 may roll over and restart the print task on the next available printer in the cluster. If no printer is available, the print processor 136 may roll over and restart the print task to the next printer whose status is busy. If the write to an alternative printer fails, the print processor 136 may repeat the above steps and roll over and restart the print task to another printer. If all printers are offline, then the print task may be canceled and the user notified. If the print task is rolled over to another printer, the print processor 136 may restart the write of the printer ready data to the printer port associated with the printer to which the print task was rolled over and notify the user.

As a non-limiting example of this type of task redistribution in RAW mode printing, a user may select printer "A" 156 as the default printer for a printing task. When the task arrives at the print processor 136, the print processor 136 checks 140 the status of connected printing devices and determines that printer "A" 156 is available. Accordingly, the print processor 136 directs the print task to printer "A" 156, as explained above. However, during despooling, the original write of the print task 144 may fail. When this occurs, a failure message 146 may be directed to the print processor 136 to signal that the task has not been completed. When a failure message 146 is received, the print processor may again check 140 the status of printing devices and determine their availability. As printer "B" 158 is available at this time, the print task may be rolled over to that printer 158. This is performed as print processor 136 restarts the printer write process 142 to the newly selected printer's port 152. The task is then routed to the destination printer 158. If the print task again fails, the print processor may again redirect the print task to another available printer or busy printer as explained above.

Figure 7:
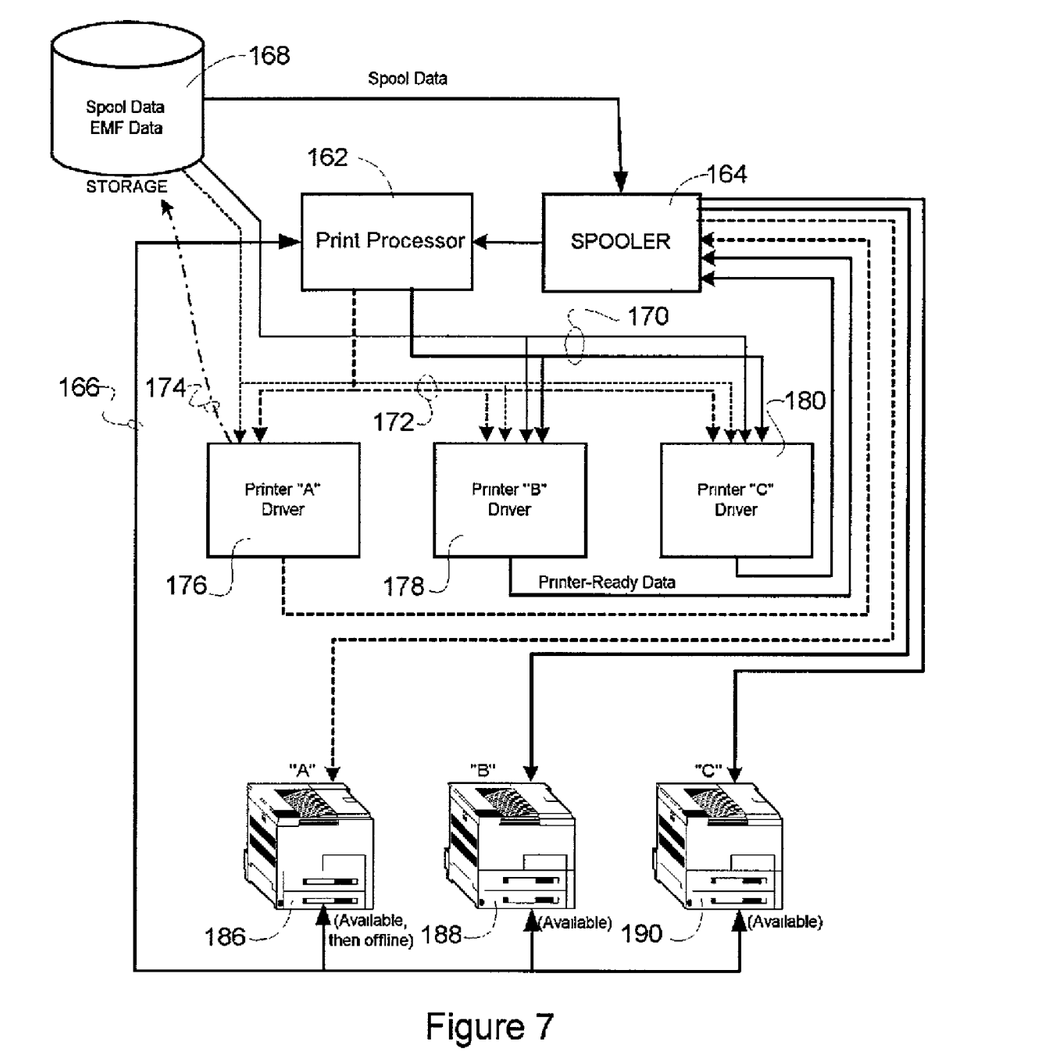
FIG. 7 is a diagram showing an embodiment of the present invention comprising print task error detection and print task redistribution for a cluster print task in EMF mode.

When an error occurs in EMF mode printing during despooling of a cluster print task, embodiments of the present invention may redistribute and restart the task or tasks on other available devices, as described in reference to FIG. 7. When a cluster printing task is printed, multiple printers will be involved and job splitting or copy splitting may be used. During despooling of these tasks (i.e., playback to driver in EMF mode) the print processor 162 may verify that the playback 172 of the journaled data to each of the printer drivers 176, 178 and 180 of the selected printers 186, 188 and 190 is progressing properly. If the original playback 172 to a printer fails, the print task for that printer may be aborted. When this occurs, the print processor 162 may then check the status of other printers. If the status is offline or busy, the printer is determined to be unavailable. A print processor 162 may restart and redistribute the failed portions of the print task or modified print tasks on the remaining available printers in the cluster. If no printer is available, the print processor 162 may restart and redistribute the failed portions of the print task or modified print tasks to printers whose status is busy. If the playback on one or more of the restarted printers fails, the print processor will repeat the above steps and restart and redistribute the print task or portions thereof on the remaining printers. If all printers are offline, the print task may be canceled and the user notified. If the failed portions of the print task are restarted and redistributed to the remaining printers, the print processor 162 will restart the playback 170 of the journaled data of the failed portion of the print task to the print drivers associated with the printers to which the failed portions of the print task were redistributed, and notify the user.

As a non-limiting example of this type of print task or modified print task redistribution, a user may select Printers A, B and C 186, 188 and 190 for printing a cluster printing task. As a result, separate print tasks or modified print tasks will be output from print processor 162 and directed to the selected printers. A print processor may check 166 the status of the selected printers to verify their availability and redirect when necessary, however, in this example, the selected printers are available. Accordingly, the spool data and EMF files of the tasks are played back 172 to the printer drivers 176, 178 and 180 of the selected printers 186, 188 and 190. During playback 172, the print processor 162 monitors the status of the print tasks to verify that they complete properly. When an error occurs, a failure message 174 is sent to the print processor 162 to signal that a task will need to be redistributed. The print processor 162 will then recheck 166 the status of connected printers and determine their availability. If other printers are found beyond the originally selected printers 186, 188 and 190 they may be added to the currently used group and the failed task may be directed to another printer not currently being used. However, in this example, no other printers are available and the print processor 162 is forced to redistribute the failed task to the printers currently in use. Accordingly, the print processor 162 redistributes the failed print task to printers B and C 188 and 190. This is achieved by restarting the playback 170 of the failed print task to the drivers 178 and 180 of these printers. In this case the failed print task must be reconfigured for two printers rather than the original one which failed. Once the print task is processed by the printer drivers 176, 178 and 180, the print task is forwarded to a spooler 164 and passed on to the destination printers 186, 188 and 190 for completion.

Figure 8:
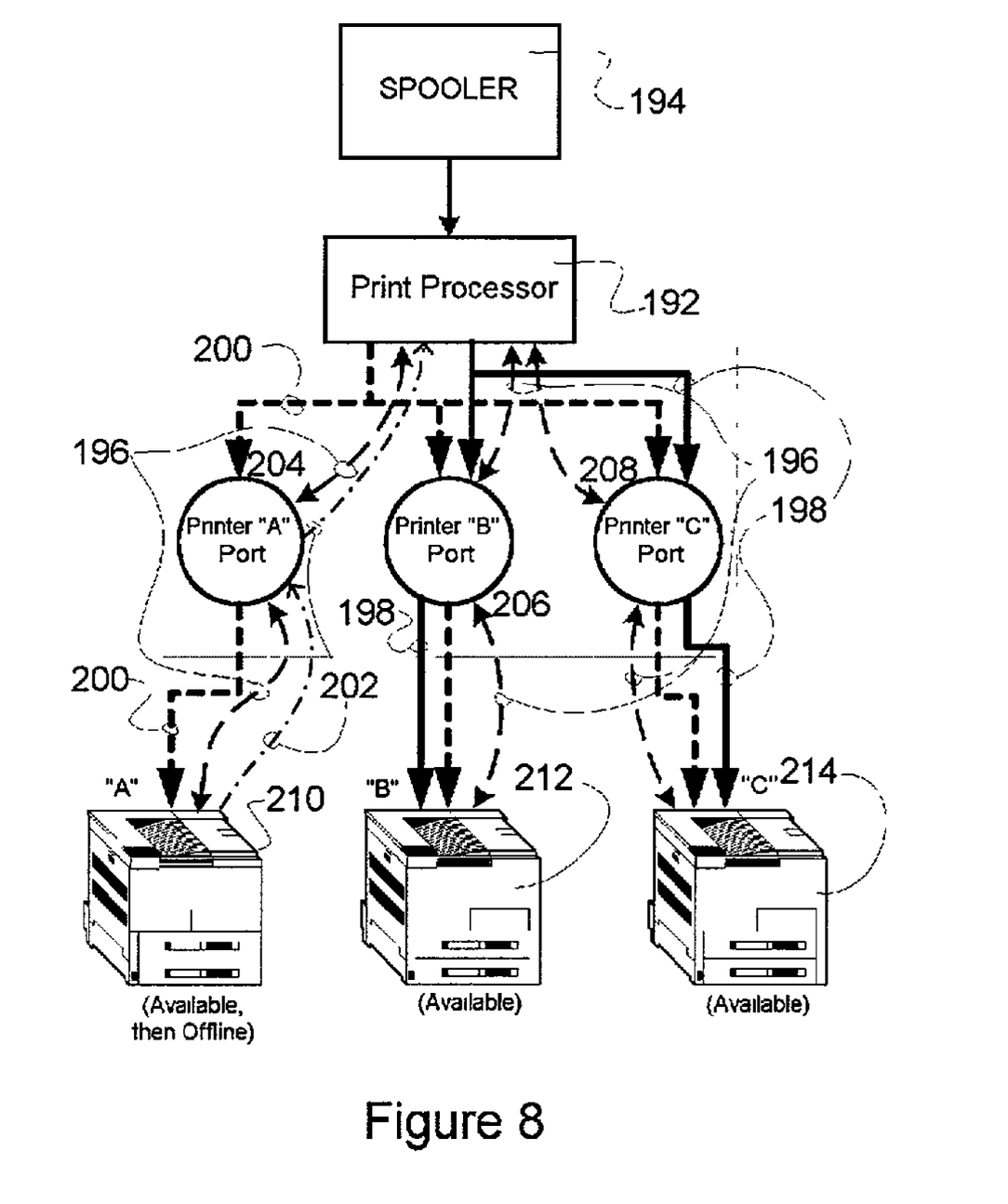
FIG. 8 is a diagram showing an embodiment of the present invention comprising print task error detection and print task redistribution for a cluster print task in RAW mode.

When an error occurs in RAW mode printing during despooling of a cluster print task, embodiments of the present invention may redistribute and restart the task or tasks on other available devices, as described in reference to FIG. 8. During despooling (i.e., write to printer port in RAW mode), the print processor 192 may check if the write 200 of the printer ready data to each of the printer ports 204, 206 and 208 of the selected printers 210, 212 and 214 is being completed. If the write to a printer fails, the print task for that printer is aborted. The print processor 192 may then check the status of other printers. If the status is offline or busy, the printer is determined to be unavailable. The print processor may restart and redistribute the failed portions of the print task to the remaining available printers. If no printer is available in the cluster, the print processor 192 may restart and redistribute the failed portions of the print task to printers whose status is busy. If the write to the printer port of one or more of the restarted printers fails, the print processor 192 may repeat the above steps and restart and redistribute the print task on other printers. If all printers are offline, the print task may be canceled and the user notified. If the failed portions of the print task are restarted and redistributed to the remaining printers in the cluster, the print processor 192 will restart the write 198 of the printer ready data of the failed portion of the print task to the printer ports associated with the printers to which the failed portions of the print task were redistributed and notify the user.

In a non-limiting example of this type of print task redistribution and error recovery, a user may select a group of printers 210, 212 and 214. The print processor 192 will write the print task to the ports 204, 206 and 208 associated with the selected printers 210, 212 and 214 until an error occurs. If an error occurs, a failure message 202 may be sent to the print processor 192. When a failure message 202 is received, the print processor 192 may abort the print task directed to the failed device and recheck 196 the status of printers in connection with the print processor 192. If other printers are available, the failed task may be redirected to those other printers, however, in this example, no other printers are available, therefore, the failed print task is redirected to printers 212 and 214 in the original group which may or may not have completed the other portions of the original print task. The failed print task is reconfigured for printing on two printers and redistributed. This is achieved by restarting the write 198 to the new printer selection. The restarted write 198 redirects the print task to the ports 206 and 208 associated with the available or busy printers 212 and 214.

The invention claimed is:

1. A method of printing from a computing device, said method comprising:
    receiving a print task originating from an application running on a computing device, said receiving occurring at a print processor, which resides on said computing device and is an integral component in an operating system of said computing device;
    receiving a selection of a preferred printing device to print said print task;
    checking the status of at least one printing devices, comprising said preferred printing device, via a direct communication between said at least one printing device and said print processor;
    sending said print task to said preferred printing device if it is available; and
    sending said print task to another available printing device if said preferred printing device is not available.

2. The method of claim 1 wherein said sending comprises transmitting spool data and EMF data to a device driver which converts said spool data and said EMF data to printer ready data which is sent via a spooler to a printing device.

3. The method of claim 1 wherein said sending comprises transmitting printer ready data from said print processor residing on said computing device through a printing device port to a printing device.

4. The method of claim 1 further comprising rechecking the status of said at least one printing devices in communication with said computing device after said print task has been sent to at least one of said preferred printing devices, and said available printing device.

5. The method of claim 4 further comprising resending said print task to an available printing device when said printing device to which said print task has been sent fails.

6. The method of claim 4 further comprising resending said print task to another busy printing device when said printing device to which said print task has been sent fails.

7. A method of printing error recovery, said method comprising:
    receiving a print task originating from an application running on a computing device, said receiving occurring at a print processor, which resides on said computing device and is an integral component in an operating system of said computing device;
    sending said print task from said print processor residing on said computing device to a first printing device;
    checking the status of said printing device after said print task has been sent to said first printing device;
    aborting said sending said print task to a first printing device; and
    sending said print task from said print processor residing on said computing device to a second printing device if said first printing device fails to print said print task.

8. The method of claim 7 wherein said second printing device is an available device.

9. The method of claim 7 wherein said second printing device is a busy device.

10. A method for increasing the reliability of a printing system, said method comprising:
    sending said print task to a print processor residing on a computing device from which said print task originated, wherein said print processor is an integral part of an operating system of said computing device;
    checking the status of printing devices in said system from said print processor residing on said computing device;
    sending said print task from said print processor residing on said computing device to a first printing device;
    rechecking the status of said first printing device, with said print processor, during printing of said print task;
    resending said print task from said print processor to a second printing device when said first printing device fails to print said print task.

11. A method for increasing the reliability of a cluster printing system, said method comprising:
    sending a print task to a print processor residing on a computing device on which said print task originates;
    checking the status of printing devices in communication with said computing device from said print processor residing on said computing device;
    splitting said print task into a plurality of modified print tasks with said print processor residing on said computing device;
    sending said modified print tasks from said print processor to a first group of printing devices;
    rechecking the status of printing devices within said first group of printing devices after said modified print tasks have been sent to said first group of printing devices;
    resending any of said modified print tasks to a printing device other than the printing device to which it was previously sent when said rechecking indicates that a printing device in said first group will not complete said any of said modified print tasks.

12. A computer readable medium comprising instructions for performing functions within a print processor, which resides on a computing device as an integral operating system component, said instructions comprising the acts of:

receiving a print task from an application running on said computing device;

detecting the status of a first printing device prior to sending said print task to said first printing device;

rechecking the status of said first printing device after sending said print task to said printing device; and sending said print task to a second printing device when said first printing device fails to print said print task.

13. A method for cluster printing, said method comprising:

sending a print task to a print processor residing on a computing device from which said print task originated, said print processor being an integral operating system component of said computing device;

checking the status of printing devices in communication with said computing device from said print processor;

splitting said print task into a first quantity of modified print tasks with said print;

sending said modified print tasks from said print processor to a first group of printing devices;

rechecking the status of printing devices within said first group of printing devices after said modified print tasks have been sent to said first group of printing devices;

reconfiguring said print task by splitting said print task into a second quantity of remodified print tasks and sending said remodified print tasks to print devices other than printing devices which fail to print when a printing device in said first group fails to print.

* * * * *